United States Patent
Kim

(10) Patent No.: US 11,256,638 B2
(45) Date of Patent: Feb. 22, 2022

(54) APPLICATION PROCESSOR SUPPORTING INTERRUPT DURING AUDIO PLAYBACK, ELECTRONIC DEVICE INCLUDING THE SAME AND METHOD OF OPERATING THE SAME

(71) Applicant: SAMSUNG ELECTRONICS CO., LTD., Suwon-si (KR)

(72) Inventor: Sun-Kyu Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/009,932

(22) Filed: Sep. 2, 2020

(65) Prior Publication Data

US 2020/0401539 A1    Dec. 24, 2020

Related U.S. Application Data

(63) Continuation of application No. 16/185,174, filed on Nov. 9, 2018, now Pat. No. 10,789,190.

(30) Foreign Application Priority Data

Jan. 25, 2018    (KR) .......................... 10-2018-0009376

(51) Int. Cl.
| | | |
|---|---|---|
| G06F 13/24 | (2006.01) | |
| G06F 3/16 | (2006.01) | |
| G06F 1/3287 | (2019.01) | |
| G06F 1/3203 | (2019.01) | |
| G06F 15/78 | (2006.01) | |
| G11B 20/10 | (2006.01) | |
| G10L 21/02 | (2013.01) | |

(52) U.S. Cl.
CPC .............. G06F 13/24 (2013.01); G06F 3/165 (2013.01); G06F 2213/24 (2013.01)

(58) Field of Classification Search
CPC ............ G08B 21/24; G08B 3/10; G06F 17/28
See application file for complete search history.

(56) References Cited

U.S. PATENT DOCUMENTS

| | | |
|---|---|---|
| 5,524,261 A | 6/1996 | Daly et al. |
| 8,150,323 B2 | 4/2012 | Kim |

(Continued)

FOREIGN PATENT DOCUMENTS

| | | |
|---|---|---|
| CN | 103379231 | 10/2013 |
| CN | 107124674 | 9/2017 |

OTHER PUBLICATIONS

U.S. Office Action dated Oct. 2, 2019 in Corresponding U.S. Appl. No. 16/185,174.

*Primary Examiner* — Getente A Yimer
(74) *Attorney, Agent, or Firm* — F. Chau & Associates, LLC

(57) ABSTRACT

An application processor includes a system bus, as well as a host processor, a voice trigger system, and an audio subsystem that are electrically connected to the system bus. The voice trigger system performs a voice trigger operation and issues a trigger event based on a trigger input signal that is provided through a trigger interface. The audio subsystem processes audio streams that are replayed or recorded through an audio interface, and receives an interrupt signal through the audio interface while an audio replay operation is performed through the audio interface.

20 Claims, 14 Drawing Sheets

(56) References Cited

U.S. PATENT DOCUMENTS

| | | | |
|---|---|---|---|
| 9,471,531 B2 | 10/2016 | Jensen | |
| 9,479,275 B2 | 10/2016 | Poulsen | |
| 2002/0099893 A1* | 7/2002 | Nguyen | G06F 13/24 710/260 |
| 2009/0307511 A1* | 12/2009 | Fiennes | G06F 1/3215 713/323 |
| 2014/0195708 A1 | 7/2014 | Klein et al. | |
| 2015/0070184 A1* | 3/2015 | Dadu | H04M 1/72403 340/692 |
| 2016/0196824 A1 | 7/2016 | Nishiwaki et al. | |
| 2017/0060596 A1* | 3/2017 | Su | G06F 9/4401 |
| 2018/0181364 A1* | 6/2018 | Gupta | G06F 3/162 |
| 2019/0227964 A1 | 7/2019 | Kim | |

* cited by examiner

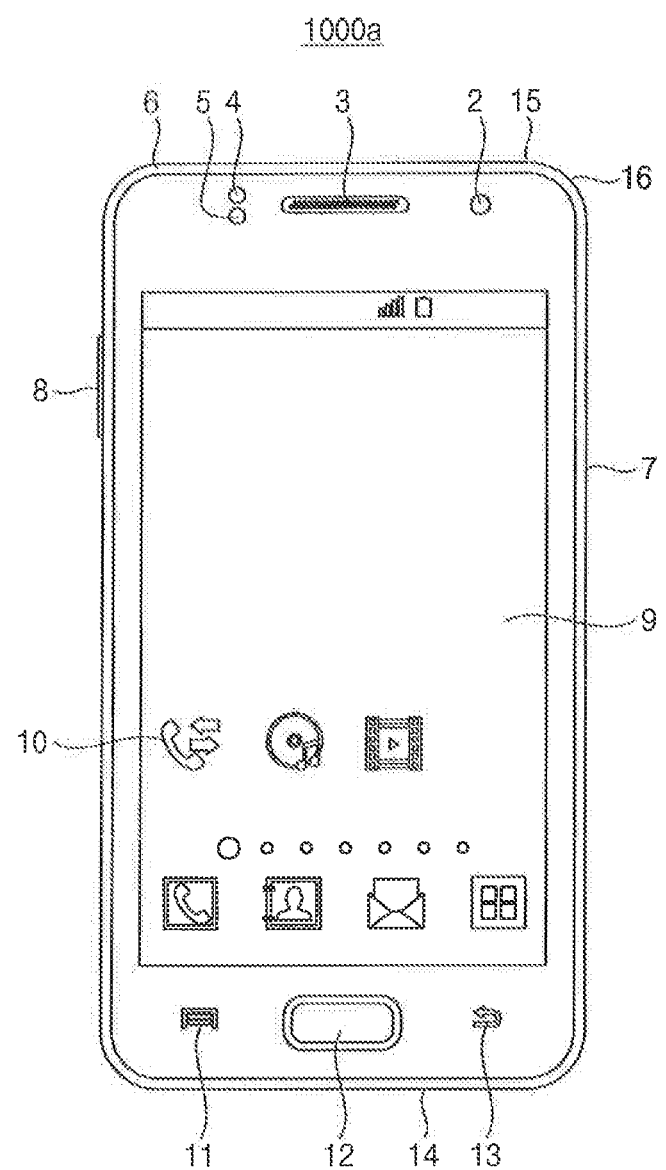

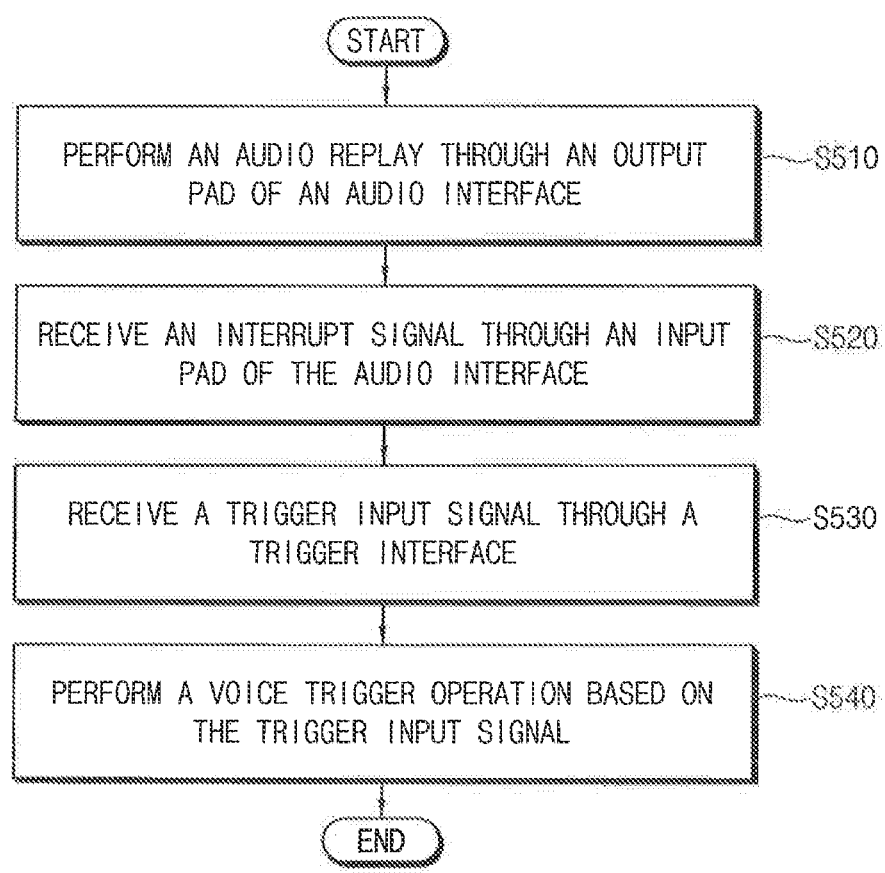

APPLICATION PROCESSOR SUPPORTING INTERRUPT DURING AUDIO PLAYBACK, ELECTRONIC DEVICE INCLUDING THE SAME AND METHOD OF OPERATING THE SAME

CROSS-REFERENCE TO RELATED APPLICATIONS

This application is a continuation application of U.S. patent application Ser. No. 16/185,174 filed Nov. 9, 2018, which claims priority under 35 USC § 119 to Korean Patent Application No. 10-2018-0009376, filed on Jan. 25, 2018, the disclosures of which are incorporated by reference herein in their entirety.

TECHNICAL FIELD

Exemplary embodiments of the inventive concept relate generally to semiconductor integrated circuits, and more particularly, to an application processor supporting interrupt during audio playback, an electronic device including the application processor, and an associated method.

DISCUSSION OF THE RELATED ART

Voice-based or sound-based intelligent interfaces, sometimes referred to as virtual assistants, are becoming more common. One advantage of such voice-based intelligent interfaces is that users can interact with a device in a hands-free manner without touching or even looking at the device. Hands-free operation can be particularly beneficial when a person cannot or should not physically handle a device, such as when a person is driving a vehicle. However, to initiate the voice-based intelligent interface, users typically must press a button or select an icon on a touch screen.

Accordingly, approaches are being developed that allow for a voice-based intelligent interface to be activated on an electronic device using an input other than a tactile input such as, for example, a voice input. To function, such an electronic device may continuously or intermittently monitor an audio channel to detect a voice input, and issue a trigger event to initiate the voice-based intelligent interface. The operation for issuing the trigger event may be referred to as a voice trigger operation. Monitoring the audio channel consumes power, which is a limited resource on handheld or portable devices that rely on batteries.

SUMMARY

Exemplary embodiments of the inventive concept provide an application processor and an electronic device including an application processor capable of performing interrupt and echo cancellation during audio playback with low power consumption.

Exemplary embodiments of the inventive concept provide a method of operating an application processor capable of performing interrupt and echo cancellation during audio playback with low power consumption.

According to an exemplary embodiment of the inventive concept, an application processor includes a system bus, as well as a host processor, a voice trigger system, and an audio subsystem that are electrically connected to the system bus. The voice trigger system performs a voice trigger operation and issues a trigger event based on a trigger input signal that is provided through a trigger interface. The audio subsystem processes audio streams that are replayed or recorded through an audio interface and receives an interrupt signal through the audio interface while an audio replay operation is performed through the audio interface.

According to an exemplary embodiment of the inventive concept, an electronic device includes an application processor and at least one audio input/output device. The application processor includes a system bus, as well as a host processor, a voice trigger system, and an audio subsystem that are electrically connected to the system bus. The voice trigger system performs a voice trigger operation and issues a trigger event based on a trigger input signal that is provided through a trigger interface. The audio subsystem processes audio streams that are replayed or recorded through an audio interface, and receives an interrupt signal through the audio interface while an audio replay operation is performed through the audio interface.

According to an exemplary embodiment of the inventive concept, a method of operating an application processor includes receiving a trigger input signal provided through a trigger interface, and issuing, by a voice trigger system, a trigger event based on the trigger input signal. The voice trigger system, an audio subsystem, and a host processor are electrically connected to one another via a system bus in a single semiconductor chip that forms the application processor. The method further includes processing, by the audio subsystem, audio streams that are replayed or recorded through an audio interface. The method further includes receiving, by the audio subsystem, an interrupt signal through the audio interface while an audio replay operation is performed through the audio interface.

The application processor, the electronic device including the application processor, and the method of operating the application processor according to exemplary embodiments of the inventive concept may perform the voice trigger operation with low power consumption and high efficiency by integrating the system bus, the host processor, the voice trigger system, and the audio subsystem together in the application processor, thus forming an on-chip voice trigger system. The on-chip voice trigger system may perform some operations instead of a host processor in the application processor to reduce the power consumption and to improve the performance of the electronic device. In addition, the audio replay operation may be performed with low power consumption, and performance of the voice trigger operation may be improved by supporting interrupt through the audio interface while the audio replay operation is being performed.

BRIEF DESCRIPTION OF THE DRAWINGS

The above and other features of the present inventive concept will become more apparent by describing in detail exemplary embodiments thereof with reference to the accompanying drawings, in which:

FIG. 2B is an exemplary implementation of the electronic device of FIG. 2A.

FIG. 6 is a flowchart illustrating a method of operating an application processor according to exemplary embodiments of the inventive concept.

DETAILED DESCRIPTION OF THE EXEMPLARY EMBODIMENTS

Figure 1:
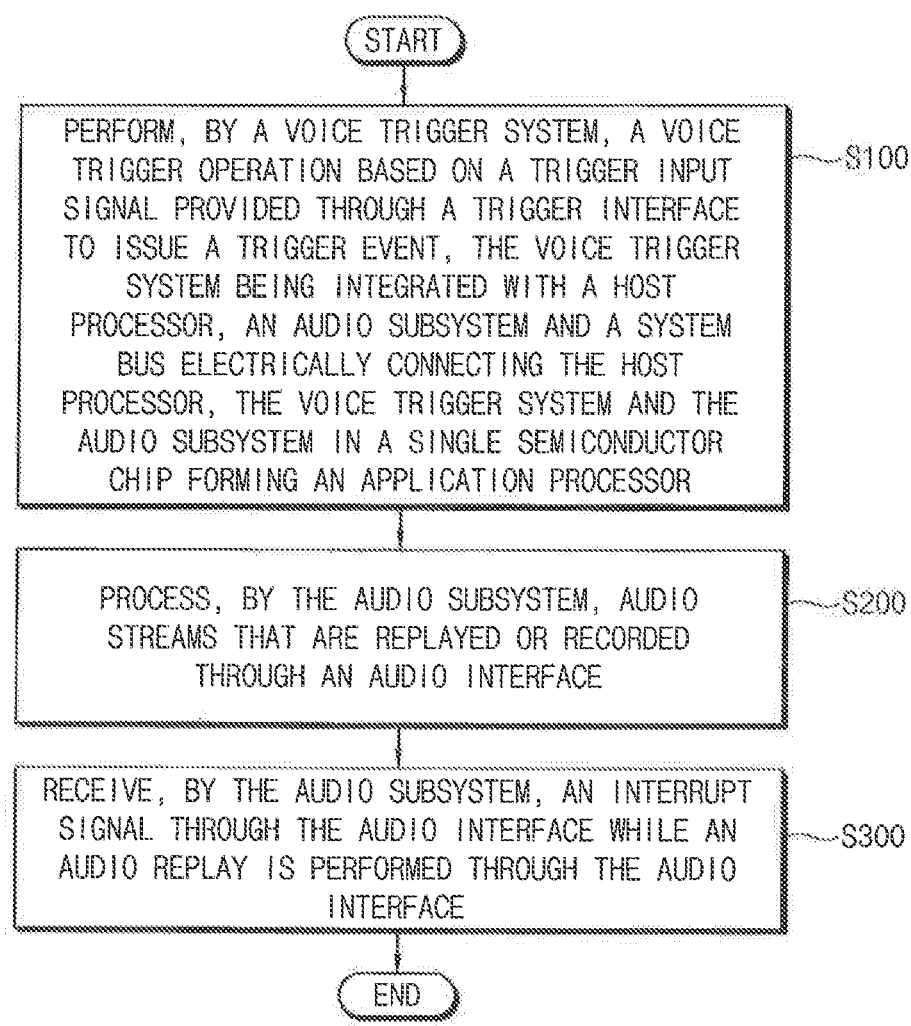
FIG. 1 is a flowchart illustrating a method of operating an application processor according to exemplary embodiments of the inventive concept.

Exemplary embodiments of the present inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

FIG. 1 is a flowchart illustrating a method of operating an application processor according to an exemplary embodiment of the inventive concept.

Referring to FIG. 1, in an exemplary embodiment, an application processor includes a host processor, a voice trigger system, an audio subsystem, and a system bus integrated as a single chip. The system bus electrically connects the host processor, the voice trigger system, and the audio subsystem. In operation S100, a voice trigger operation is performed by the voice trigger system based on a trigger input signal provided through a trigger interface to issue a trigger event. Audio streams that are replayed or recorded through an audio interface are processed by the audio subsystem in operation S200. The audio subsystem may further support the transfer of the audio streams between the audio interface and a memory device.

Herein, the terms voice trigger system and voice trigger circuit may be used interchangeably, and the terms audio subsystem and audio subsystem circuit may be used interchangeably.

The voice trigger operation according to exemplary embodiments of the inventive concept indicates an operation to monitor whether the trigger input signal includes a particular trigger sound, and issues a trigger event such as, for example, an interrupt signal to initiate a voice recognition mode or a voice-based intelligent interface when the trigger sound is detected. The initiation of the voice recognition mode may include launching the host processor and/or the system bus into an active mode from a sleep mode. To reduce power consumption, the voice trigger system may be enabled to perform the voice trigger operation while the host processor and the system bus are in the sleep mode, and the host processor and the system bus may be launched into the active mode only if the trigger event is issued and the voice recognition is initiated.

In exemplary embodiments, the trigger sound may include, for example, a word or a phrase of a human voice, or sounds other than a human voice such as, for example, a whistle, a sound of hands clapping, a siren, a sound of a collision, a sound wave of a particular frequency range, etc.

An interrupt signal is received by the audio subsystem through the audio interface while an audio replay operation is performed through the audio interface in operation S300. For example, according to exemplary embodiments, an interrupt signal is received through the audio interface, and an audio replay operation is performed through the audio interface, simultaneously.

The application processor, an electronic device including the application processor, and a method of operating the application processor according to exemplary embodiments of the inventive concept perform the voice trigger operation with low power and high efficiency by integrating the voice trigger system in the application processor. In addition, the audio replay operation may be performed with low power consumption, and performance of the voice trigger operation may be improved, by supporting the interrupt procedure through the audio interface during the audio replay operation (e.g., by supporting the interrupt procedure through the audio interface while audio data is being played back).

Figure 2A:
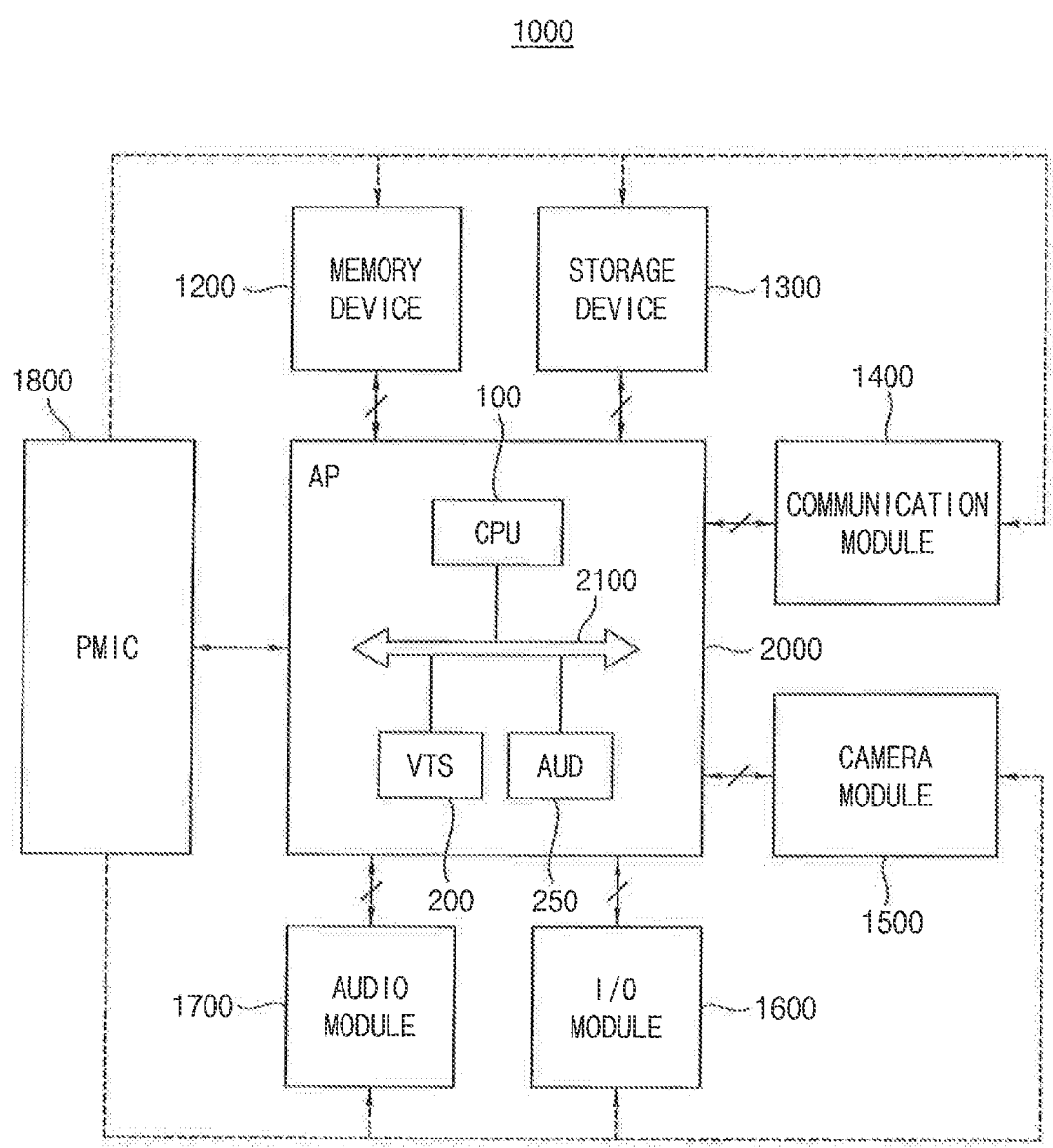
FIG. 2A is a block diagram illustrating an electronic device according to exemplary embodiments of the inventive concept.

FIG. 2A is a block diagram illustrating an electronic device according to an exemplary embodiment of the inventive concept.

Referring to FIG. 2A, in an exemplary embodiment, an electronic device 1000 includes an application processor AP 2000, a memory device 1200, a storage device 1300, a plurality of functional modules 1400, 1500, 1600 and 1700, and a power management integrated circuit PMIC 1800.

The application processor 2000 controls the overall operations of the electronic device 1000. For example, the application processor 2000 controls the memory device 1200, the storage device 1300, and the plurality of functional modules 1400, 1500, 1600 and 1700. The application processor 2000 may be, for example, a system-on-chip (SoC).

In an exemplary embodiment, the application processor 2000 includes a system bus 2100, a host processor or a central processing unit (CPU) 100, a voice trigger system VTS 200, and an audio processing system AUD 250, which are electrically connected to the system bus 2100.

The voice trigger system 200 is electrically connected to the system bus 2100, and performs a voice trigger operation and issues a trigger event based on a trigger input signal that is provided through a trigger interface. The audio processing system 250 may include at least an audio subsystem, as will be described below. The audio subsystem is electrically connected to the system bus 2100, and may process audio streams that are replayed or recorded through an audio interface. In addition, the audio subsystem may further support the transfer of the audio streams between the audio interface and the memory device 1200. Exemplary embodiments of the voice trigger system 200 and the audio processing system 250 will be described below with reference to FIGS. 3 through 10.

The memory device 1200 and the storage device 1300 may store data for operations of the electronic device 1000. The memory device 1200 may include a volatile memory device such as, for example, a dynamic random access memory (DRAM), a static random access memory (SRAM), a mobile DRAM, etc. The storage device 1300 may include a nonvolatile memory device such as, for example, an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc. In exemplary embodiments, the storage device 1300 further includes an embedded multimedia card (eMMC), a universal flash storage (UFS), a solid state drive (SSD), a hard disk drive (HDD), a CD-ROM, etc.

The functional modules 1400, 1500, 1600 and 1700 may perform various functions of the electronic device 1000. For example, the electronic device 1000 may include a communication module 1400 that performs a communication function (e.g., a code division multiple access (CDMA) module, a long term evolution (LTE) module, a radio frequency (RF) module, an ultra-wideband (UWB) module, a wireless local area network (WLAN) module, a worldwide interoperability for a microwave access (WIMAX) module, etc.). The electronic device 1000 may further include a camera module 1500 that performs a camera function, an input/output (I/O) module 1600 including, for example, a display module that performs a display function and a touch panel module that performs a touch sensing function, and an audio module 1700 including, for example, a microphone (MIC) module, a speaker module, etc. that performs input/output of audio signals. In exemplary embodiments, the electronic device 1000 may further include a global positioning system (GPS) module, a gyroscope module, etc. It is to be understood that the functional modules 1400, 1500, 1600 and 1700 included in the electronic device 1000 are not limited to those illustrated in FIG. 2A.

The power management integrated circuit 1800 may provide an operating voltage to the application processor 2000, the memory device 1200, the storage device 1300, and the functional modules 1400, 1500, 1600 and 1700.

FIG. 2B is an exemplary implementation of the electronic device of FIG. 2A.

The electronic device 1000 of FIG. 2A may be a device such as, for example, a desktop computer, a laptop computer, a cellular phone, a smartphone, an MP3 player, a personal digital assistant (PDA), a portable multimedia player (PMP), a digital television, a digital camera, a server computer, a workstation, a set-top box, a portable game console, a navigation system, a wearable device, an Internet of Things (IoT) device, an Internet of Everything (IoE) device, an e-book, a virtual reality (VR) device, an augmented reality (AR) device, etc. The electronic device 1000 may typically be operated in response to direct user input, but may also be used to communicate with other devices via the Internet or other network systems. FIG. 2B illustrates a cellular phone or a smartphone including a touch screen as an example of the electronic device 1000 of FIG. 2A.

Referring to FIG. 2B, in an exemplary embodiment, an electronic device 1000a includes a front-facing camera 2, a speaker 3, a proximity sensor 4, an ambient light sensor 5, a universal serial bus (USB) interface 6, a power button 7, a volume button 8, a display and touch screen 9, icons 10, a menu button 11, a home button 12, a back button 13, a microphone 14, an audio output interface 15, and an antenna 16. It is to be understood that the elements illustrated in FIG. 2B are exemplary, and that the electronic device 1000a is not limited thereto.

The front-facing camera 2 faces in the same direction as the display and touch screen 9, and may be used, for example, for a video call or video or photo shooting. The speaker 3 outputs audio data. For example, the speaker 3 may output audio data when a user plays multimedia data by touching the display and touch screen 9 on one of the icons 10, when a user inputs a signal via speech, when a user talks with another user over a public switched telephone network, or when an operation sound of the electronic device 1000a or a notification sound is played. The proximity sensor 4 may control the display and touch screen 9 to adjust the brightness or turn the display on and off, and to save power and prevent accidental touches when a user holds the electronic device 1000a up to an ear for a telephone conversation. The ambient light sensor 5 may control the operations of the display and touch screen 9 and the front-facing camera 2 based on the amount of incident light from the surroundings of the electronic device 1000a. The USB interface 6 may be an input/output interface for data communication with external devices and power supply.

The power button 7 may turn the power of the electronic device 1000a on and off, and may turn the display and touch screen 9 on and off. The volume button 8 may control the audio output of the speaker 3. The icons 10 corresponding to different functions may be displayed on the display and touch screen 9. For example, a user may touch an icon 10 that causes playback of multimedia data.

The menu button 11 may allow a user to browse a menu including icons and settings. The home button 12 may allow a home screen to appear for multi-working mode even while the electronic device 1000a is performing a certain operation on the display and touch screen 9. The back button 13 may cancel an operation which is currently being performed by the electronic device 1000a and return a user to a previous screen.

The microphone 14 may be an input/output (I/O) interface for voice calls or voice input signals. The audio output interface 15 (e.g., a headphone jack) may be used for audio output of multimedia data that is being played. Audio output and microphone input may be interfaced through a device supporting BLUETOOTH. The antenna 16 may be used to receive digital media broadcasting service. The elements of the electronic device 1000a may be embodied in various ways as understood by those of ordinary skill in the art. According to exemplary embodiments, some of the elements in FIG. 2B may be omitted or replaced with other elements.

Figure 3:
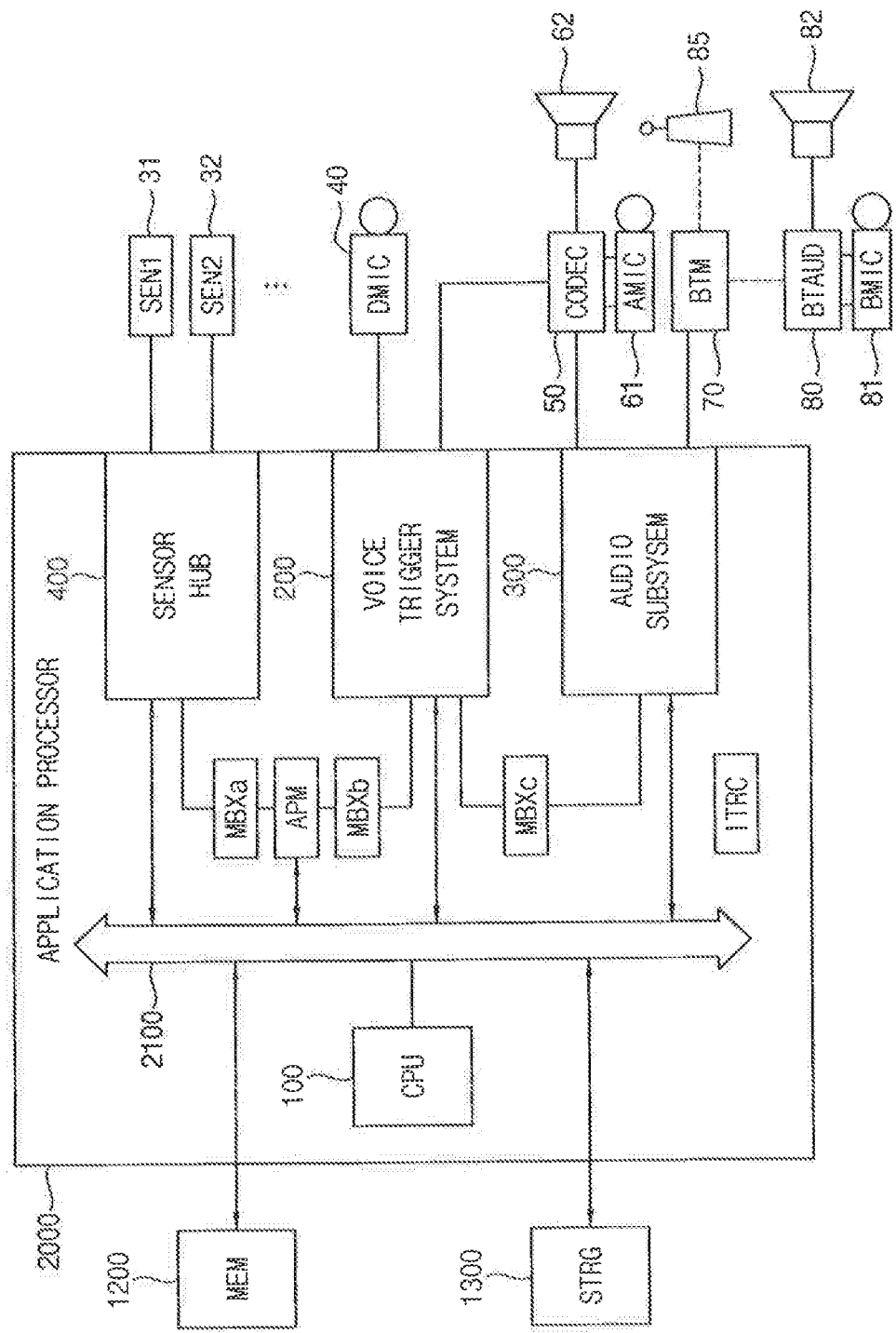
FIG. 3 is a block diagram illustrating an application processor according to exemplary embodiments of the inventive concept.

FIG. 3 is a block diagram illustrating an application processor according to an exemplary embodiment of the inventive concept.

Referring to FIG. 3, in an exemplary embodiment, an application processor 2000 includes a system bus 2100, a host processor CPU 100, a voice trigger system 200, an audio subsystem 300, and a sensor hub 400. The audio subsystem 300 and the sensor hub 400 may be included in the audio processing system 250 in FIG. 2A. According to an exemplary embodiment, the application processor 2000 may further include an active power manager APM, mail box modules MBXa, MBXb and MBXc (also referred to as mail box circuits), and an interrupt controller ITRC.

The system bus 2100 may also be referred to herein as an interconnect device or a backbone. The system bus 2100 may include a higher-layer bus, a lower-layer bus, and a bridge connecting the higher-layer bus to the lower-layer bus. For example, the system bus 2100 may include various buses such as an advanced extensible interface (AXI), an advanced high-performance bus (AHB), an advanced peripheral bus (APB), etc., and at least one bridge connecting the buses. The host processor 100 may access external devices such as, for example, the memory device 1200 and/or the storage device 1300 through the system bus 2100. In addition, the host processor 100 may communicate with the voice trigger system 200, the audio subsystem 300, and the sensor hub 400 through the system bus 2100.

Although one interrupt controller ITRC is illustrated in FIG. 3 for convenience of illustration, exemplary embodiments of the inventive concept are not limited thereto. For example, according to exemplary embodiments, the interrupt controller ITRC may include at least one general interrupt controller (GIC), at least one vectored interrupt controller (VIC), etc. The interrupt controller ITRC may be implemented as, for example, a programmable interrupt controller (PIC). The programmable interrupt controller may be implemented with multiple layers having a priority system represented by vectors. The programmable interrupt controller may receive an interrupt signal from peripheral devices, determine priorities of the received interrupt signal, and issue an interrupt signal with a pointer address to a processor or a controller.

The active power manager APM may manage the power of the application processor 2000. For example, the active power manager APM may manage the power supplied to respective regions or function blocks of the application processor 2000. The mail box modules MBXa, MBXb and MBXc may support a synchronization of data communication between the elements in the application processor 2000, or data communication between the application processor 2000 and external devices. The mail box modules MBXa, MBXb and MBXc will be described below with reference to FIG. 5.

The voice trigger system 200 is electrically connected to the system bus 2100. The voice trigger system 200 performs a voice trigger operation and issues a trigger event based on a trigger input signal that is provided through a trigger interface. In exemplary embodiments, the voice trigger system 200 may receive the trigger input signal from a digital microphone DMIC 40 and/or an audio codec (coder and decoder) CODEC 50. For example, the trigger interface of the voice trigger system 200 may be connected directly to the digital microphone 40 and the audio codec 50. The audio codec 50 may perform encoding and decoding (or analog-to-digital conversion (ADC) and digital-to-analog conversion (DAC)) of an audio signal received from the digital microphone 40 or an analog microphone AMIC 61 and an audio signal output to a speaker 62. The digital microphone 40 may be, for example, an on-board microphone that is mounted with the application processor 2000 on a board of the electronic device. The analog microphone 61 and the speaker 62 may be devices that are attachable and detachable to and from terminals of the audio codec 50.

The audio subsystem 300 is electrically connected to the system bus 2100. The audio subsystem 300 processes audio streams that are replayed or recorded through an audio interface and supports the transfer of the audio streams between the memory device 1200 and the audio interface. In exemplary embodiments, the audio subsystem 300 may exchange the audio streams with the audio codec 50 and/or a BLUETOOTH module BTM 70. The BLUETOOTH module 70 may also be referred to herein as a BLUETOOTH circuit. For example, the audio interface of the audio subsystem 300 may be connected directly to the audio codec 50 and the BLUETOOTH module 70. The BLUETOOTH module 70 may be connected to a BLUETOOTH microphone BMIC 81 and a BLUETOOTH speaker 82 through a BLUETOOTH audio module BTAUD 80 to receive the audio signal from the BLUETOOTH microphone 81 and output the audio signal to the BLUETOOTH speaker 82. The BLUETOOTH module 70 may be connected directly to an arbitrary BLUETOOTH device 85. The audio subsystem 300 may be connected to a universal serial bus (USB) module to exchange the audio stream with the USB module.

The sensor hub 400 is electrically connected to the system bus 2100. The sensor hub 400 processes signals provided from one or more sensors SEN1 31 and SEN2 32. The sensor hub 400 may measure physical quantities associated with the electronic device to detect the operation status of the electronic device and process the detected information. For example, the sensors 31 and 32 may include a motion sensor, a gyro sensor, an atmospheric pressure sensor, a magnetic sensor, an accelerometer, a grip sensor, a proximity sensor, a biometric sensor, a temperature/humidity sensor, an illumination sensor, an ultra violet (UV) sensor, an electrical-nose (E-nose) sensor, an electromyography (EMG) sensor, an electroencephalogram (EEG) sensor, an electrocardiogram (ECG) sensor, an infrared (IR) sensor, an iris sensor, and/or a finger print sensor.

In exemplary embodiments, as illustrated in FIG. 3, all of the system bus 2100, the voice trigger system 200, the audio subsystem 300, and the sensor hub 400 may be integrated in a single semiconductor chip forming the application processor 2000. In other exemplary embodiments, the system bus 2100, the voice trigger system 200, and the audio subsystem 300 may be integrated in a single chip, and the sensor hub 400 may be disposed external to the application processor 2000. As a result, the application processor, the electronic device including the application processor, and the method of operating the application processor according to exemplary embodiments of the inventive concept may perform the voice trigger operation with low power and high efficiency by integrating the voice trigger system in the application processor.

Figure 4:
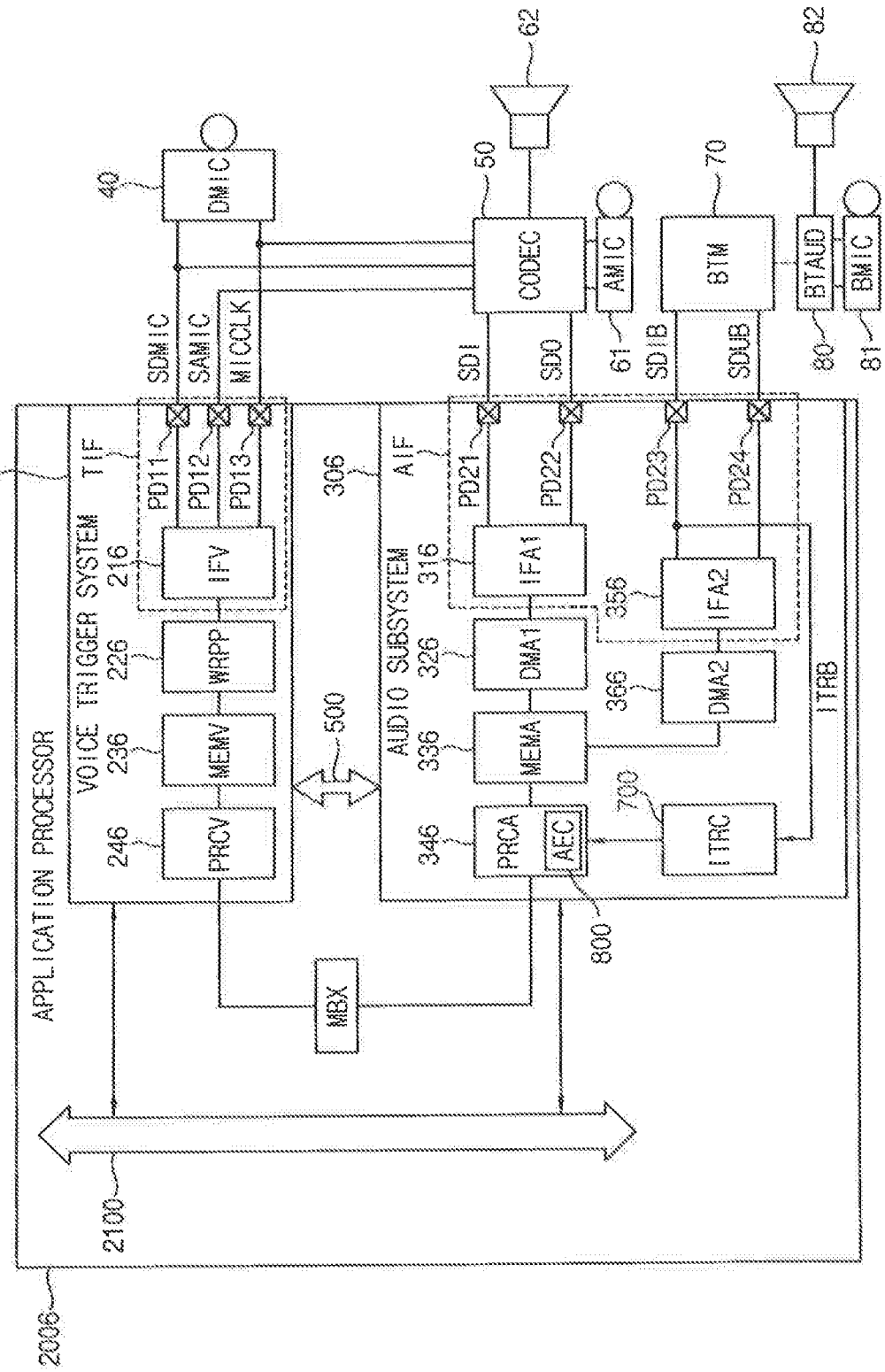
FIG. 4 is a block diagram illustrating an exemplary connection of a voice trigger system and an audio subsystem in an application processor according to exemplary embodiments of the inventive concept.

FIG. 4 is a block diagram illustrating an exemplary connection of a voice trigger system and an audio subsystem in an application processor according to exemplary embodiments of the inventive concept. For convenience of explanation, a further description of elements and processes previously described may be omitted herein, and the host processor 100 and other elements of FIG. 3 are omitted in FIG. 4.

Referring to FIG. 4, in an exemplary embodiment, an application processor 2000b includes a system bus 2100, a voice trigger system 206, an audio subsystem 306, a direct bus 500, and a mail box module MBX. The audio subsystem 306 may be included in the audio processing system 250 in FIG. 2A.

The voice trigger system 206 is electrically connected to the system bus 2100. The voice trigger system 206 performs a voice trigger operation based on trigger input signals SDMIC and SAMIC that are provided through a trigger interface TIF. The voice trigger system 206 may receive the trigger input signal SDMIC from a digital microphone DMIC 40 and/or the trigger input signal SAMIC from an audio codec (coder and decoder) CODEC 50. A microphone clock signal MICCLK may be transferred between the voice trigger system 206, the digital microphone 40, and the audio codec 50 for synchronization of a signal transfer. The trigger input signals SDMIC and SAMIC and the microphone clock signal MICCLK may be transferred through pads PD11, PD12 and PD13 included in the trigger interface TIF. The pads PD11, PD12 and PD13 may be implemented such that the used pad are prevented from being interfered with other unused pads.

The audio subsystem 306 is electrically connected to the system bus 2100. The audio subsystem 306 processes audio streams that are replayed or recorded through an audio interface AIF, and supports the transfer of the audio streams between the memory device 1200 and the audio interface.

In exemplary embodiments, the audio subsystem 306 may exchange the audio streams with the audio codec 50. The audio subsystem 306 may receive an audio input signal SDI through an audio input pad PD21 of the audio interface AIF from the audio codec 50, and may transmit an audio output signal SDO through an audio output pad PD22 of the audio interface AIF to the audio codec 50.

In exemplary embodiments, the audio subsystem 306 may exchange the audio streams with the BLUETOOTH module 70. The audio subsystem 306 may receive an audio input signal SDIB through a BLUETOOTH input pad PD23 of the audio interface AIF from the BLUETOOTH module 70, and may transmit an audio output signal SDOB through a BLUETOOTH output pad PD24 of the audio interface AIF to the BLUETOOTH module 70.

The voice trigger system 206 may include a trigger interface circuit IFV 216, a wrapper WRPP 226, a trigger memory MEMV 236, and a trigger processor PRCV 246.

The trigger interface circuit 216 and the pads PD11, PD12 and PD13 may form the trigger interface TIF, which is used to sample and convert the trigger input signals SDMIC and SAMIC provided from the digital microphone 40 or the audio codec 50. The wrapper 226 may store data provided from trigger interface circuit 216 in the trigger memory 236. The wrapper 226 may issue an interrupt signal to the trigger processor 246 when a predetermined amount of data is stored in the trigger memory 236 so that the trigger processor 246 may perform the voice trigger operation based on data stored in the trigger memory 236.

In exemplary embodiments, the voice trigger system 206 may receive a pulse density modulation (PDM) signal as the trigger input signals SDMIC and SAMIC, and convert the PDM signal to pulse code modulation (PCM) data. The wrapper 226 may store the PCM data in the trigger memory 236. The wrapper 226 may be implemented, for example, with a direct memory access controller.

The audio subsystem 306 may include a first audio interface circuit IFA1 316, a first direct memory access controller DMA1 326, an audio memory MEMA 336, an audio processor PRCA 346, a second audio interface circuit IFA2 356, a second direct memory access controller DMA2 366, and an interrupt controller ITRC 700.

The first audio interface circuit 316, the second audio interface circuit 356, and the pads PD21, PD22, PD23 and PD24 may form the audio interface AIF, which transfers the audio streams through the audio input signals SDI and SDIB and the audio output signals SDO and SDOB. The audio memory 336 may store data of the audio streams, and the first and second direct memory access controllers 326 and 366 may control access to the audio memory 346 (e.g., data read from the audio memory 336 and data written to the audio memory 336). The audio processor 346 may process data stored in the audio memory 336.

The application processor 2006 may further include the mail box module MBX supporting synchronization of a data transmission or a data communication between the voice trigger system 206 and the audio subsystem 306. The mail box module MBX will be described below with reference to FIG. 5A.

Echo cancellation may be utilized to improve performance of recognition rate of the voice trigger operation while the audio subsystem 306 performs the audio replay.

In exemplary embodiments, the audio processor 346 in the audio subsystem 306 may include an echo canceller AEC 800 as illustrated in FIG. 4. The echo canceller 800 will be described below with reference to FIG. 5B. The echo canceller 800 may also be referred to herein as an echo cancelling circuit.

In exemplary embodiments, while the audio replay is performed through an output pad of the audio interface AIF, the audio subsystem 306 may receive an interrupt signal ITRB through an input pad of the audio interface AIF. For example, in exemplary embodiments, the audio replay operation is performed through an output pad of the audio interface AIF, and the audio subsystem 306 receives an interrupt signal ITRB through an input pad of the audio interface AIF, simultaneously. In this case, the voice trigger system 206 may receive the trigger input signal SDMIC or SAMIC through the trigger interface TIF, and perform the voice trigger operation based on the trigger input signal SDMIC or SAMIC.

For example, as illustrated in FIG. 4, the interrupt signal ITRB may be received through the BLUETOOTH input pad PD23 from the BLUETOOTH module 70 while the audio replay is performed through the BLUETOOTH output pad PD24. For example, according to exemplary embodiments, the interrupt signal ITRB is received through the BLUETOOTH input pad PD23 from the BLUETOOTH module 70, and an audio replay operation is performed through the BLUETOOTH output pad PD24, simultaneously. The interrupt signal ITRB may represent, for example, an error of the audio replay. The received interrupt signal ITRB may be provided to the interrupt controller 700, and the interrupt controller 700 may transmit a control signal according to the interrupt signal ITRB to the audio processor 346. The voice trigger system 206 may receive the trigger input signal SDMIC or SAMIC through the trigger interface TIF. In this case, the voice trigger system 206 may transfer sample data of the trigger input signal SDMIC or SAMIC to the audio subsystem 306, and the echo canceller 800 in the audio subsystem 306 may perform the echo cancellation with respect to the sample data based on audio output data of the audio output signal SDO or SDOB to generate compensated sample data. The audio subsystem 306 may transfer the compensated sample data to the voice trigger system 206, and the voice trigger system 206 may perform the voice trigger operation based on the compensated sample data. The transfer of the compensated sample data may be performed through the system bus 2100 or through the direct bus 500 independently of the system bus 2100. The direct bus 500 is not limited to a typical bus system, and the direct bus 500 may be implemented with arbitrary signal transmission schemes.

In exemplary embodiments, the first audio interface circuit 316 is compatible with the I2S or IIS (Inter-IC Sound or Integrated Interchip Sound) standard. In exemplary embodiments, the first audio interface circuit 316 may operate based on clock signals according to the I2S standard. In exemplary embodiments, the first audio interface circuit 316 may be connected directly to the digital microphone 40 and/or the audio codec 50.

In exemplary embodiments, the second audio interface circuit 356 may be compatible with the UART (universal asynchronous receiver transmitter) standard. In exemplary embodiments, the second audio interface circuit 356 may operate based on clock signals according to the UART standard. In exemplary embodiments, the second audio interface circuit 356 may be connected directly to the BLUETOOTH module 70.

The direct bus 500 may electrically connect the voice trigger system 206 and the audio subsystem 306 to provide a direct signal path between them.

The application processor 200b may perform data communication between the voice trigger system 206 and the audio subsystem 306 using the mail box module MBX. The data communication may be performed through the system bus 2100 or through the direct bus 500 independently of the system bus 2100.

The direct bus 500 is not limited to a typical bus system, and the direct bus 500 may be implemented with arbitrary signal transmission schemes.

As a result, according to exemplary embodiments of the inventive concept, the audio replay operation is performed with low power consumption, and recognition rate and performance of the voice trigger operation is improved, by supporting an interrupt through the input pad PD23 of the audio interface AIF while the audio replay operation is performed through the output pad PD24 of the audio interface AIF. For example, according to exemplary embodiments of the inventive concept, an interrupt is provided through the input pad PD23 of the audio interface AIF, and the audio replay operation is performed through the output pad PD24 of the audio interface AIF, simultaneously.

Figure 5A:
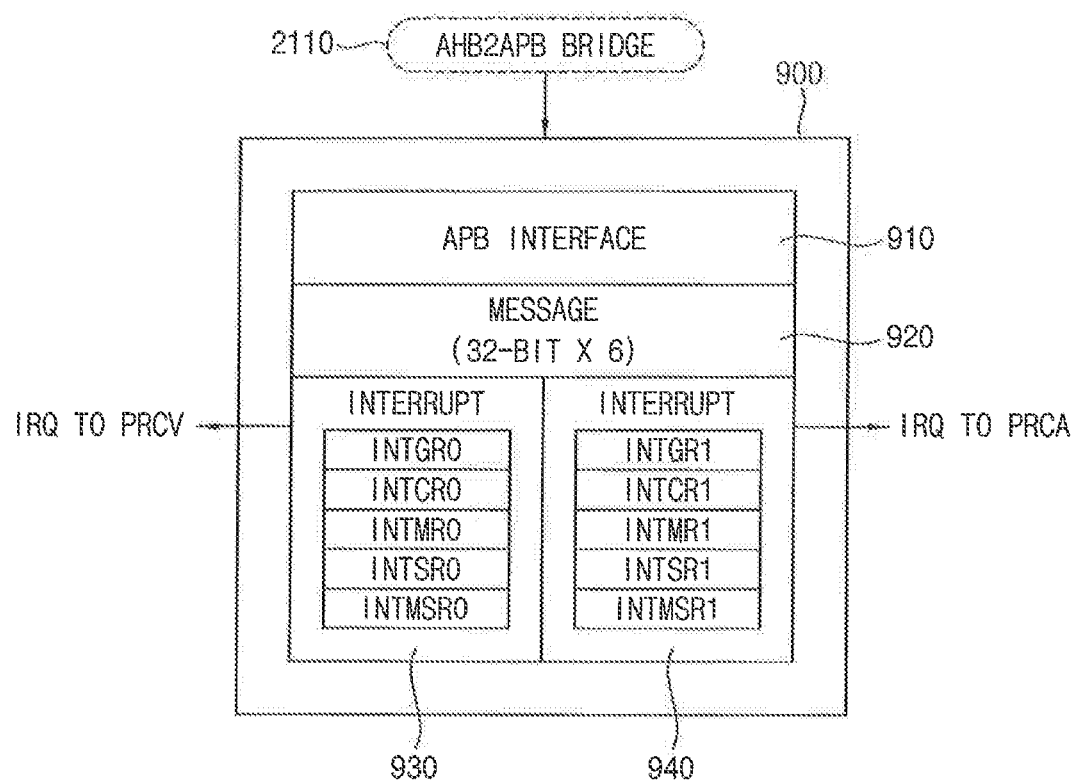
FIG. 5A is a diagram illustrating an exemplary embodiment of a mail box module included in the application processor of FIG. 4.

FIG. 5A is a diagram illustrating an exemplary embodiment of a mail box module included in the application processor of FIG. 4.

Referring to FIG. 5A, in an exemplary embodiment, a mail box module 900 includes an interface 910, a message box 920, a first register circuit 930 including a plurality of registers INTGR0, INTCR0, INTMR0, INTSR0 and INTMSR0, and a second register circuit 940 including a plurality of registers INTGR1, INTCR1, INTMR1, INTSR1 and INTMSR1. The mail box module 900 may also be referred to herein as a mailbox circuit. FIG. 5A illustrates a non-limiting example in which the mail box module 900 is connected to an AHB2APB bridge 2110 of the system bus 2100 through an APB interface, and in which the message box 920 is implemented with shared registers of 6*32 bits. However, exemplary embodiments of the inventive concept are not limited thereto. For example, according to exemplary embodiments, the type of the interface 910, the number of registers in the message box 920, and the number of bits of the registers in the message box 920 may vary. The first register circuit 930 may generate an interrupt signal (IRQ TO PRCV) provided to the trigger processor PRCV 246 in the voice trigger system 206, and the second register circuit 940 may generate an interrupt signal (IRQ TO PRCA) provided to the audio processor PRCA 346 in the audio subsystem 306. The data transmission between the voice trigger system 206 and the audio subsystem 306 may be synchronized using the mail box module 900.

The mail box module 900 may perform bilateral communication by transmitting an interrupt signal after one of the trigger processor PRCV 246 and the audio processor PRCA 346 writes a message in the message box 920. The synchronization of the data transmission between the voice trigger system 206 and the audio subsystem 306 may be implemented using, for example, a polling method.

Figure 5B:
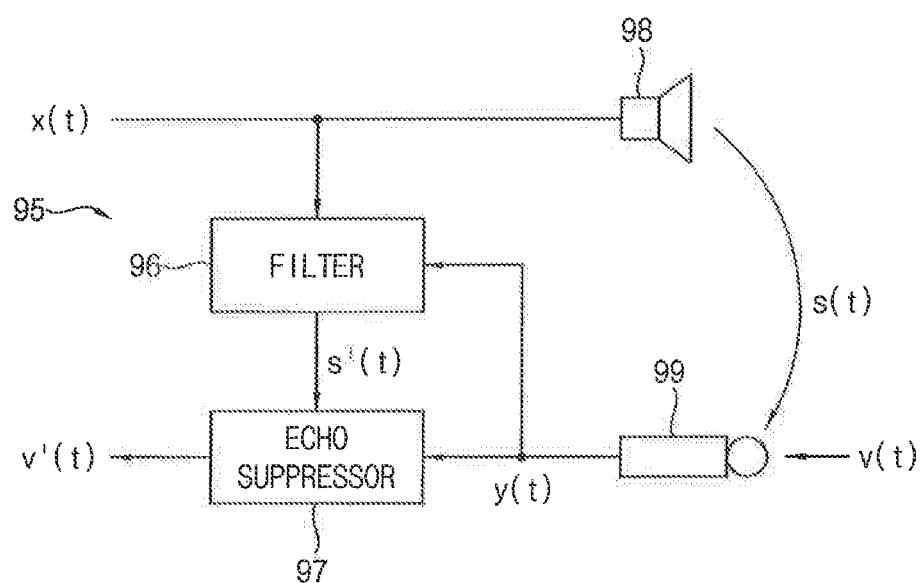
FIG. 5B is a block diagram illustrating an echo canceller included in an application processor according to exemplary embodiments of the inventive concept.

FIG. 5B is a block diagram illustrating an echo canceller included in an application processor according to exemplary embodiments of the inventive concept.

Referring to FIG. 5B, in an exemplary embodiment, an acoustic echo canceller 95 (also referred to as an echo canceller) includes a filter 96 and an echo suppressor 97.

An audio output signal x(t) provided from the audio subsystem 300 in FIG. 3 may be output from a speaker 98 to a user. A microphone 99 may receive an audio input signal y(t). A digital-to-analog conversion (DAC) operation may be applied to the audio output signal x(t) (e.g., a digital signal) before playback from the speaker 98, and an analog-to-digital conversion (ADC) operation may be applied to a signal captured by the microphone 99 to obtain the audio input signal y(t) (e.g., a digital signal).

The audio input signal y(t) received by the microphone 99 may include a near-end signal v(t) and an echo signal s(t). The near-end signal v(t) may be referred to as a desired signal or primary signal that the user intends for the microphone 99 to receive. The echo signal s(t) may include an echo component resulting from audio signals outputted from the speaker 98. The audio input signal y(t) may include noise. The echo component and the noise may act as interferences for the near-end signal v(t). Thus, according to exemplary embodiments, the echo component and the noise are canceled or removed.

In exemplary embodiments, at least one of various algorithms such as, for example, doubletalk detection, step-size control, etc. may be used to perform the echo cancellation.

The filter 96 may estimate the echo signal s(t) included in the audio input signal y(t) based on the audio output signal x(t) and the audio input signal y(t) to generate an estimated echo signal s'(t). For example, the filter 96 may model the echo component in the audio input signal y(t) and an echo path causing the echo component, and estimate how the echo path changes the desired audio output signal x(t) to an undesired echo component in the audio input signal y(t). The audio output signal x(t) may be used as a reference signal.

The echo path describes the effects of the acoustic paths travelled by a far-end signal from the speaker 98 to the microphone 99. The far-end signal may travel directly from the speaker 98 to the microphone 99, or the far-end signal may be reflected from various surfaces in an environment of a near-end terminal. The echo path traversed by the far-end signal output from the speaker 98 may be regarded as a system having a frequency and a phase response which may vary over time.

In exemplary embodiments, the echo path may be modeled based on at least one of various linear filters such as, for example, a finite impulse response (FIR) filter, an infinite impulse response (IIR) filter, etc. For example, the estimate of the echo path may be a vector having (N+1) values where N is a natural number, and the filter 96 may be implemented as an N-th order filter which has a finite length (in time).

In exemplary embodiments, the estimate of the echo path is not explicitly calculated, but rather, is represented by means of filter coefficients obtained from at least one of various stochastic gradient algorithms such as, for example, Least Mean Squares (LMS), Normalized Least Mean Squares (NLMS), Fast Affine Projection (FAP) and Recursive Least Squares (RLS), etc.

In exemplary embodiments, the estimate of the echo path may be continuously updated in real-time.

The echo suppressor 97 may generate an estimated near-end signal v'(t) based on the estimated echo signal s'(t) and the audio input signal y(t). For example, the echo suppressor 97 may apply an echo suppression to the audio input signal y(t) based on the estimated echo signal s'(t) to generate the estimated near-end signal v'(t), thereby suppressing the echo in the received audio signal. The estimated near-end signal v'(t) may be closer to the near-end signal v(t) as the echo path is more precisely estimated.

In exemplary embodiments, the echo suppressor 97 may be implemented as an echo subtractor. For example, the echo subtractor may subtract the estimated echo signal s'(t) from the audio input signal y(t) to generate the estimated near-end signal v'(t).

According to exemplary embodiments, the elements in the echo canceller 95 may be implemented with various configurations, some elements in the echo canceller 95 may be omitted or replaced with other elements, and some elements may be added to the echo canceller 95. According to exemplary embodiments, at least a part of the echo canceller 95 may be implemented as hardware, or as instructions and/or program routines (e.g., a software program).

FIG. 6 is a flowchart illustrating a method of operating an application processor according to exemplary embodiments of the inventive concept.

Referring to FIGS. 4 and 6, an audio replay is performed through an output pad of an audio interface AIF in operation S510. While the audio replay is performed, an interrupt signal ITRB is received by the audio subsystem 306 through an input pad of the audio interface AIF in operation S520. For example, the interrupt signal ITRB may be received through the BLUETOOTH input pad PD23 while the audio replay is performed through the BLUETOOTH output pad PD24. For example, according to exemplary embodiments, the interrupt signal ITRB is received through the BLUETOOTH input pad PD23, and the audio replay operation is performed through the BLUETOOTH output pad PD24, simultaneously.

While the audio replay is performed through the output pad of the audio interface AIF, a trigger input signal SDMIC or SAMIC is received by the voice trigger system 206 through a trigger interface TIF in operation S530, and a voice trigger operation is performed by the voice trigger system 206 based on the trigger input signal SDMIC or SAMIC in operation S540.

The echo cancellation may be performed before the voice trigger operation to improve reliability of the voice trigger operation. In exemplary embodiments, the echo canceller 95 may be included in the audio subsystem 306 as illustrated in FIG. 4. In other exemplary embodiments, the echo canceller 95 may be included in the voice trigger system 206. According to exemplary embodiments, data transmission between the voice trigger system 206 and the audio subsystem 306 may be performed through the system bus 2100 or through the direct bus 500. The data communication may be synchronized using the mail box module MBX.

Figure 7:
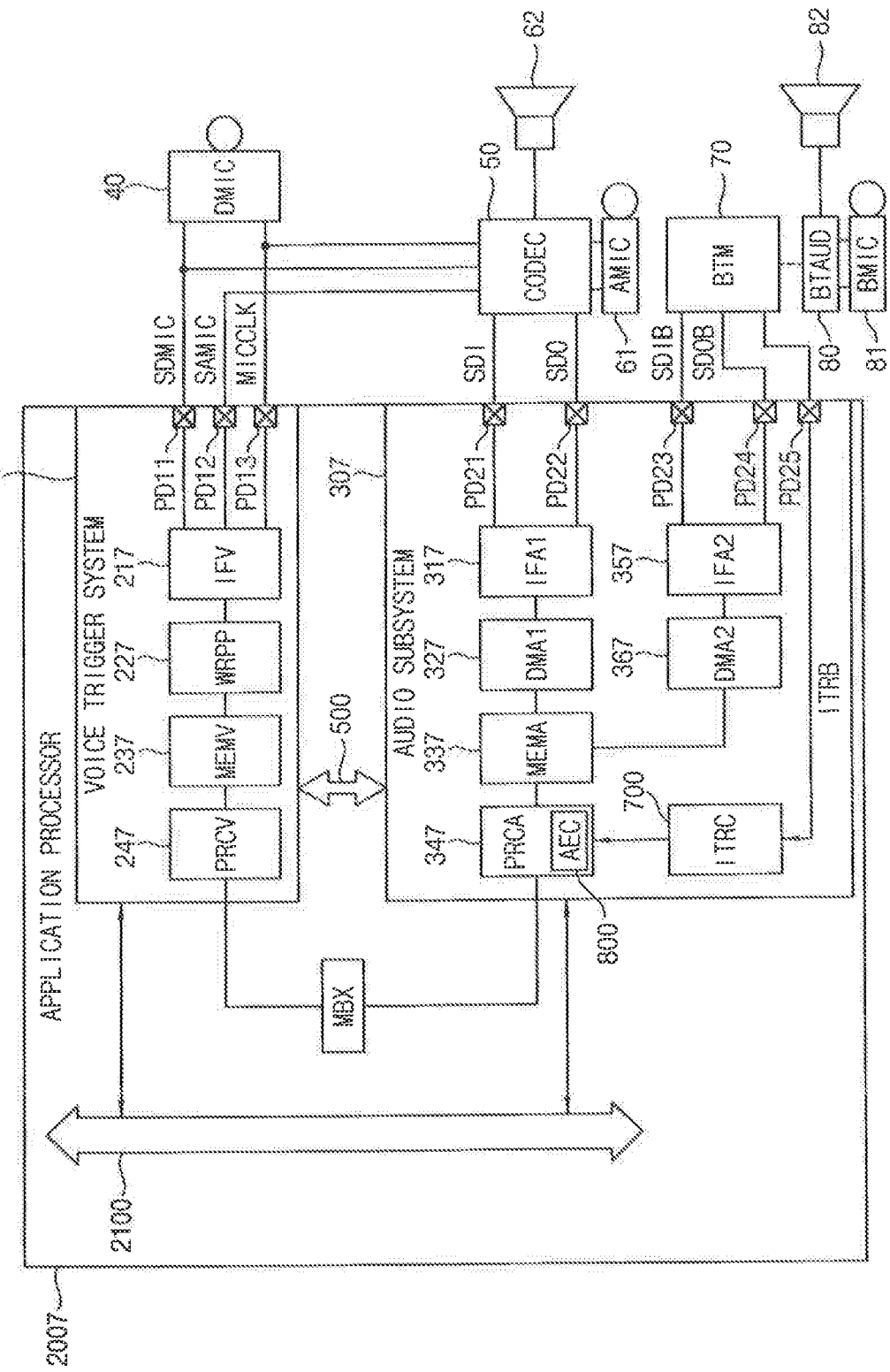
FIG. 7 is a block diagram illustrating an exemplary connection of a voice trigger system and an audio subsystem in an application processor according to exemplary embodiments of the inventive concept.

FIG. 7 is a block diagram illustrating an exemplary connection of a voice trigger system and an audio subsystem in an application processor according to exemplary embodiments of the inventive concept. For convenience of explanation, a further description of elements and processes previously described may be omitted herein, and the host processor 100 and other elements of FIG. 3 are omitted in FIG. 7.

Referring to FIG. 7, in an exemplary embodiment, an application processor 2007 includes a system bus 2100, a voice trigger system 207, an audio subsystem 307, a direct bus 500, and a mail box module MBX. The audio subsystem 307 may be included in the audio processing system 250 in FIG. 2A.

The voice trigger system 207 is electrically connected to the system bus 2100. The voice trigger system 207 performs a voice trigger operation based on trigger input signals SDMIC and SAMIC that are provided through a trigger interface TIF. The voice trigger system 207 may receive the trigger input signal SDMIC from a digital microphone DMIC 40, and/or may receive the trigger input signal SAMIC from an audio codec CODEC 50. A microphone clock signal MICCLK may be transferred between the voice trigger system 207, the digital microphone 40, and the audio codec 50 for synchronization of a signal transfer. The trigger input signals SDMIC and SAMIC and the microphone clock signal MICCLK may be transferred through pads PD11, PD12 and PD13.

The audio subsystem 307 is electrically connected to the system bus 2100. The audio subsystem 307 processes audio streams that are replayed or recorded through an audio interface AIF, and supports the transfer of the audio streams between the memory device 1200 and the audio interface.

In exemplary embodiments, the audio subsystem 307 may exchange the audio streams with the audio codec 50. The audio subsystem 307 may receive an audio input signal SDI through an audio input pad PD21 of the audio interface AIF from the audio codec 50, and transmit an audio output signal SDO through an audio output pad PD22 of the audio interface AIF to the audio codec 50.

In exemplary embodiments, the audio subsystem 307 may exchange the audio streams with the BLUETOOTH module 70. The audio subsystem 306 may receive an audio input signal SDIB through a BLUETOOTH input pad PD23 of the audio interface AIF from the BLUETOOTH module 70, and transmit an audio output signal SDOB through a BLUETOOTH output pad PD24 of the audio interface AIF to the BLUETOOTH module 70.

The voice trigger system 207 may include a trigger interface circuit IFV 217, a wrapper WRPP 227, a trigger memory MEMV 237, and a trigger processor PRCV 247. The audio subsystem 307 may include a first audio interface circuit IFA1 317, a first direct memory access controller DMA1 327, an audio memory MEMA 337, an audio processor PRCA 347, a second audio interface circuit IFA2 357, a second direct memory access controller DMA2 367, and an interrupt controller ITRC 700. The operations of the voice trigger system 207 and the audio subsystem 307 are substantially the same as those described with reference to FIG. 4. Accordingly, a repeated description thereof is omitted.

The application processor 2007 may further include the mail box module MBX supporting a synchronization of a data transmission or a data communication between the voice trigger system 207 and the audio subsystem 307. The mail box module MBX is the same as described above with reference to FIG. 5A. According to exemplary embodiments, an echo cancellation operation may be performed to improve performance of recognition rate of the voice trigger operation while the audio subsystem 307 performs the audio replay. Thus, in exemplary embodiments, the audio processor 347 included in the audio subsystem 307 may include an echo canceller AEC 800 as illustrated in FIG. 7. The echo canceller 800 is the same as described above with reference to FIG. 5B.

In exemplary embodiments, while the audio replay is performed through an output pad of the audio interface AIF, an interrupt signal ITRB is received through an additional interrupt pad PD25 of the audio interface AIF. In this case, the audio subsystem 307 may receive the audio input signal through the audio interface AIF and perform the voice trigger operation based on the audio input signal.

For example, as illustrated in FIG. 7, the interrupt signal ITRB may be received through the BLUETOOTH interrupt pad PD25 from the BLUETOOTH module 70 while the audio replay is performed through the BLUETOOTH output pad PD24. The interrupt signal ITRB may represent, for example, an error of the audio replay. The received interrupt signal ITRB may be provided to the interrupt controller 700, and the interrupt controller 700 may transmit a control signal according to the interrupt signal ITRB to the audio processor 347 included in the audio subsystem 307. The audio subsystem 307 may receive the BLUETOOTH input signal SDIB through the BLUETOOTH input pad PD23. In this case, the echo canceller 800 included in the audio subsystem 307 may perform echo cancellation with respect to audio input data of the BLUETOOTH input signal SDIB based on audio output data of the BLUETOOTH output signal SDOB to generate compensated audio input data. The audio subsystem 307 may transfer the compensated audio input data to the voice trigger system 207, and the voice trigger system 207 may perform the voice trigger operation based on the compensated audio input data. The transfer of the audio input data and the compensated audio input data may be performed through the system bus 2100 or through the direct bus 500 independently of the system bus 2100.

The audio subsystem 307 may receive the input signal for the voice trigger operation through the BLUETOOTH input pad PD23 because the interrupt may be received through the BLUETOOTH interrupt pad PD25, and thus, the trigger interface TIF of the voice trigger system 207 may be disabled. In addition, the first audio interface circuit 317 of the audio subsystem 307, the digital microphone 40, and the audio codec 50 may be disabled. As such, power consumption for the voice trigger operation may be further reduced using the additional BLUETOOTH interrupt pad PD25.

In exemplary embodiments, the first audio interface circuit 317 may be compatible with the I2S or IIS standard. In exemplary embodiments, the first audio interface circuit 317 may operate based on clock signals according to the I2S standard. In exemplary embodiments, the first audio interface circuit 317 may be connected directly to the digital microphone 40 and/or the audio codec 50.

In exemplary embodiments, the second audio interface circuit 357 may be compatible with the UART standard. In exemplary embodiments, the second audio interface circuit 357 may operate based on clock signals according to the UART standard. In exemplary embodiments, the second audio interface circuit 357 may be connected directly to the BLUETOOTH module 70.

The direct bus 500 may electrically connect the voice trigger system 207 and the audio subsystem 307 to provide a direct signal path between them.

The application processor 2007 may perform data communication between the voice trigger system 207 and the audio subsystem 307 using the mail box module MBX, through the system bus 2100, or through the direct bus 500 independently of the system bus 2100.

As a result, according to exemplary embodiments of the inventive concept, the audio replay is performed with low power consumption, and the recognition rate and performance of the voice trigger operation is improved by supporting the interrupt through the additional interrupt pad PD25 of the audio interface AIF while the audio replay is performed through the output pad PD24 of the audio interface AIF (e.g., by simultaneously supporting the interrupt operation and the audio replay operation).

Figure 8:
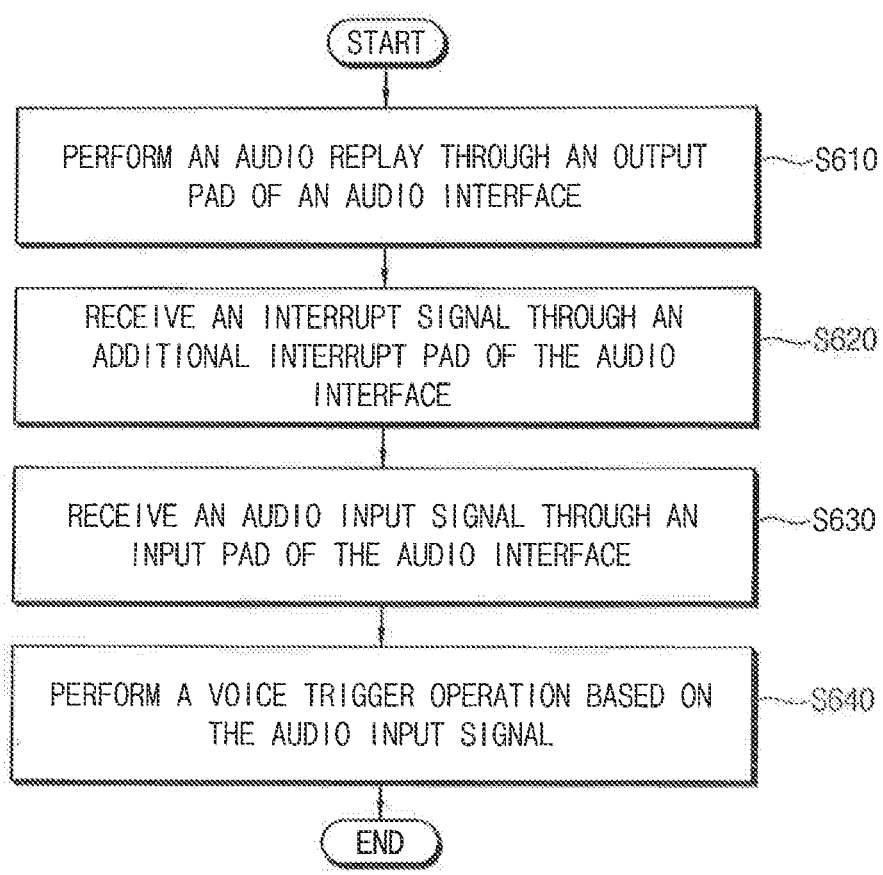
FIG. 8 is a flowchart illustrating a method of operating an application processor according to exemplary embodiments of the inventive concept.

FIG. 8 is a flowchart illustrating a method of operating an application processor according to exemplary embodiments of the inventive concept.

Referring to FIGS. 7 and 8, in an exemplary embodiment, an audio replay is performed through an output pad of an audio interface AIF in operation S610. While the audio replay is performed, an interrupt signal ITRB is received by the audio subsystem 307 through an additional interrupt pad of the audio interface AIF in operation S620. For example, the interrupt signal ITRB may be received by the audio subsystem 307 through the BLUETOOTH interrupt pad PD25 while the audio replay is performed through the BLUETOOTH output pad PD24.

While the audio replay is performed through the output pad of the audio interface AIF, a trigger input signal SDMIC or SAMIC is received by the voice trigger system 207 through a trigger interface TIF in operation S630, and a voice trigger operation is performed by the voice trigger system 207 based on the trigger input signal SDMIC or SAMIC in operation S640.

As described above, according to exemplary embodiments of the inventive concept, an echo cancellation may be performed before the voice trigger operation to improve reliability of the voice trigger operation. In exemplary embodiments, the echo canceller 800 may be included in the audio subsystem 306 as illustrated in FIG. 7. In other exemplary embodiments, the echo canceller 800 may be included in the voice trigger system 206. According to exemplary embodiments, data transmission between the voice trigger system 206 and the audio subsystem 306 may be performed through the system bus 2100 or through the direct bus 500. Data communication may be synchronized using the mail box module MBX.

Figure 9:
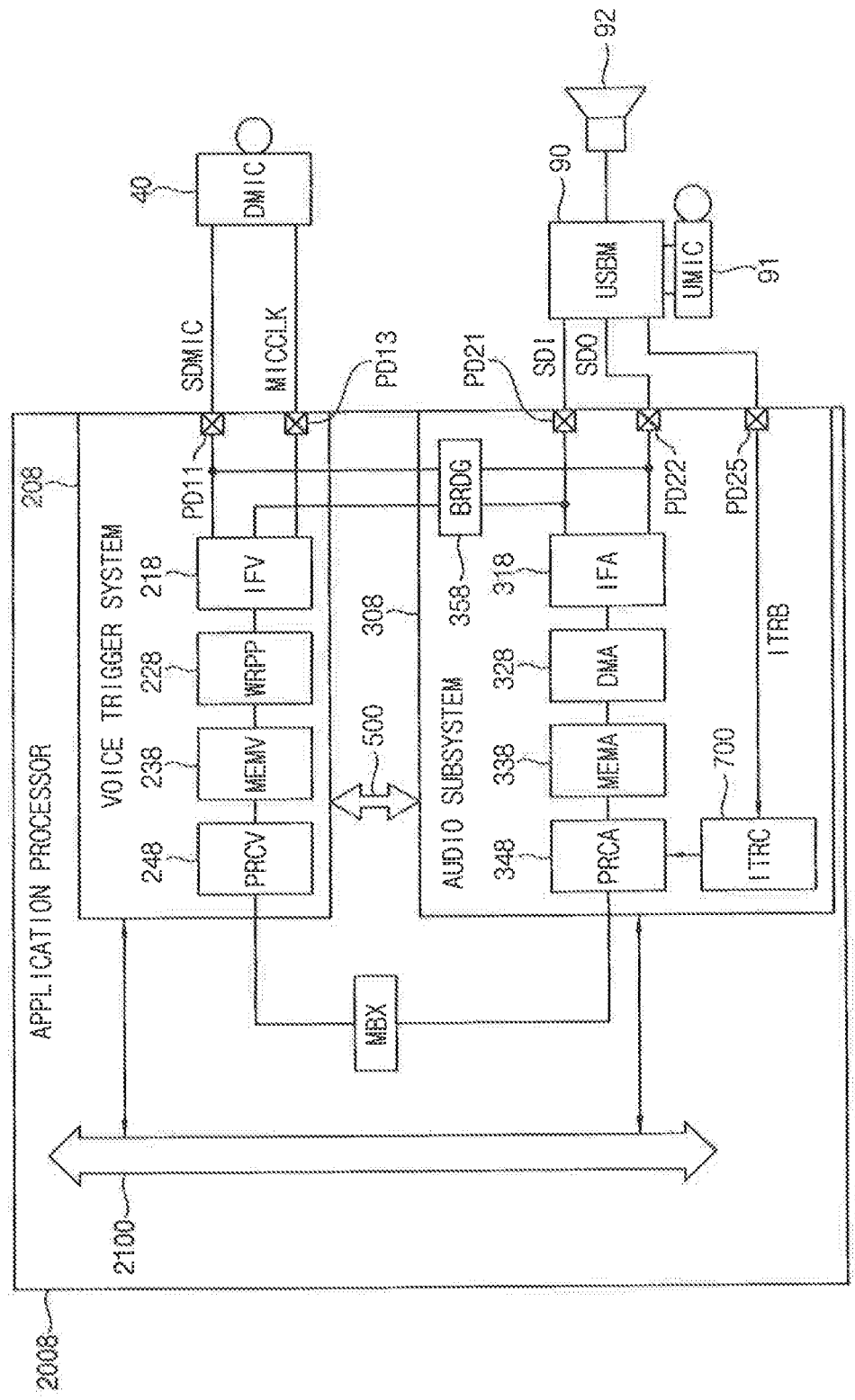
FIGS. 9 and 10 are block diagrams illustrating exemplary connections of a voice trigger system and an audio subsystem in an application processor according to exemplary embodiments of the inventive concept.
Figure 10:
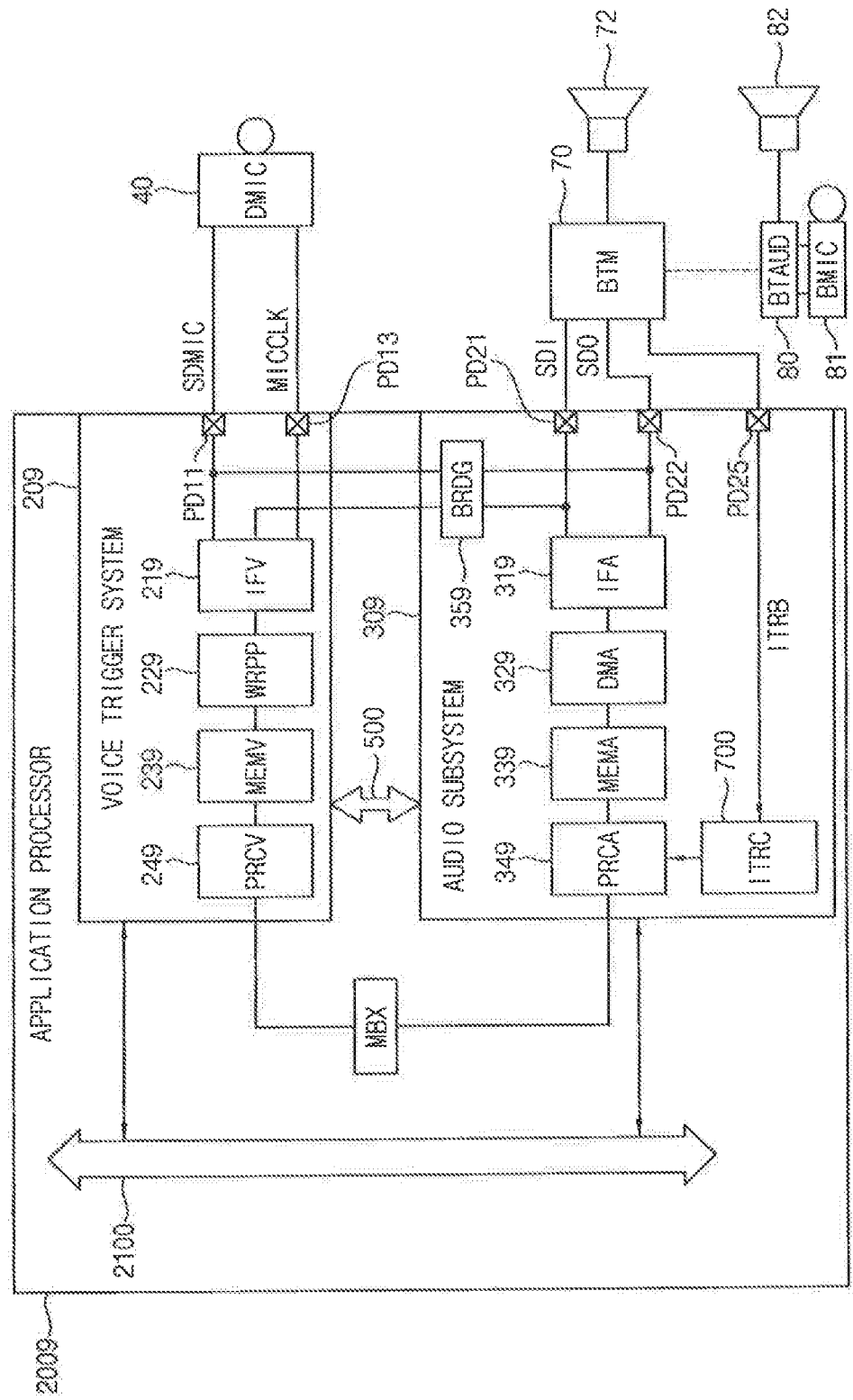

FIGS. 9 and 10 are block diagrams illustrating exemplary connections of a voice trigger system and an audio subsystem in an application processor according to exemplary embodiments of the inventive concept. Other than the audio subsystem, the elements in FIGS. 9 and 10 are the same as those described with reference to FIGS. 4 through 8. For convenience of explanation, a further description of elements previously described may be omitted herein.

Referring to FIG. 9, in an exemplary embodiment, an application processor 2008 includes a system bus 2100, a voice trigger system 208, an audio subsystem 308, a direct bus 500, and a mail box module MBX. The audio subsystem 308 may be included in the audio processing system 250 in FIG. 2A.

The voice trigger system 208 may include a trigger interface circuit IFV 218, a wrapper WRPP 228, a trigger memory MEMV 238, and a trigger processor PRCV 248. The audio subsystem 308 may include an audio interface circuit IFA 318, a direct memory access controller DMA 328, an audio memory MEMA 338, an audio processor PRCA 348, a bridge circuit 358, and an interrupt controller ITRC 700.

In comparison with the application processor 2007 of FIG. 7, the application processor 2008 of FIG. 9 does not include the interface for connection to the audio codec 50, and the audio subsystem 308 may exchange the audio streams with a universal serial bus (USB) module USBM 90. The USB module 90 may also be referred to herein as a USB circuit. The USB module 90 is connected to a USB microphone UMIC 91 and a USB speaker 92. The audio subsystem 308 may receive an audio input signal SDI through an input pad PD21 of the audio interface AIF from the USB module 90, and transmit an audio output signal SDO through an output pad PD22 of the audio interface AIF to the USB module 90. The bridge circuit 358 may convert the USB signal to a signal for the trigger interface circuit 218 such as, for example, a pulse density modulation (PDM) signal.

In exemplary embodiments, while the audio replay is performed through an output pad PD 22 of the audio interface AIF, the audio subsystem 308 receives an interrupt signal ITRB through an additional USB interrupt pad PD25 of the audio interface AIF. The interrupt signal ITRB may represent, for example, an error of the audio replay. The received interrupt signal ITRB may be provided to the interrupt controller 700. The interrupt controller 700 may transmit a control signal according to the interrupt signal ITRB to the audio processor 348 included in the audio subsystem 308.

Referring to FIG. 10, in an exemplary embodiment, an application processor 2009 includes a system bus 2100, a voice trigger system 209, an audio subsystem 309, a direct bus 500, and a mail box module MBX. The audio subsystem 309 may be included in the audio processing system 250 in FIG. 2A.

The voice trigger system 209 may include a trigger interface circuit IFV 219, a wrapper WRPP 229, a trigger memory MEMV 239, and a trigger processor PRCV 249. The audio subsystem 309 may include an audio interface circuit IFA 319, a direct memory access controller DMA 329, an audio memory MEMA 339, an audio processor PRCA 349, a bridge circuit 359, and an interrupt controller ITRC 700.

In comparison with the application processor 2007 of FIG. 7, the application processor 2009 of FIG. 10 does not include the interface for connection to the audio codec 50, and the audio subsystem 309 may exchange the audio streams with a BLUETOOTH module BTM 70. The BLUETOOTH module 70 is connected to a BLUETOOTH speaker 72. The audio subsystem 309 may receive an audio input signal SDI through an input pad PD21 of the audio interface AIF from the BLUETOOTH module 70, and transmit an audio output signal SDO through an output pad PD22 of the audio interface AIF to the BLUETOOTH module 70. The bridge circuit 359 may convert the USB signal to a signal for the trigger interface circuit 219 such as, for example, a pulse density modulation (PDM) signal.

In exemplary embodiments, while the audio replay is performed through a BLUETOOTH output pad PD22 of the audio interface AIF, the audio subsystem 309 receives an interrupt signal ITRB through an additional BLUETOOTH interrupt pad PD25 of the audio interface AIF. The interrupt signal ITRB may represent, for example, an error of the audio replay. The received interrupt signal ITRB may be provided to the interrupt controller 700, and the interrupt controller 700 may transmit a control signal according to the interrupt signal ITRB to the audio processor 349 included in the audio subsystem 309.

Figure 11A:
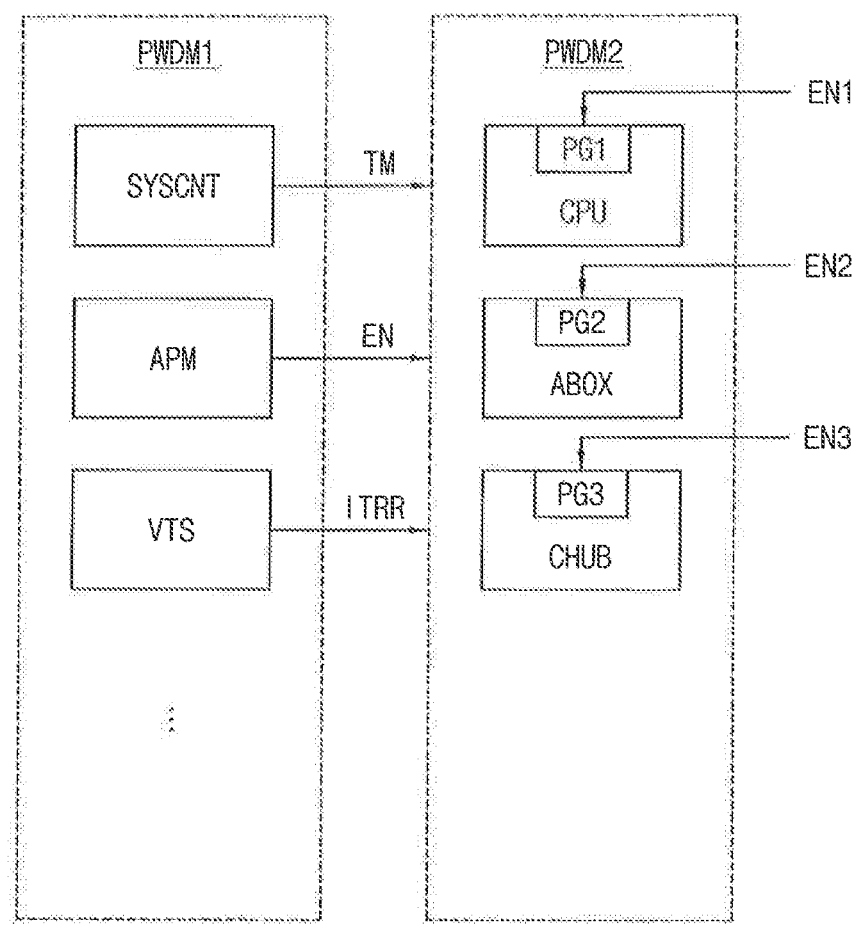
FIGS. 11A and 11B are diagrams for describing power domains of an application processor according to exemplary embodiments of the inventive concept.
Figure 11B:
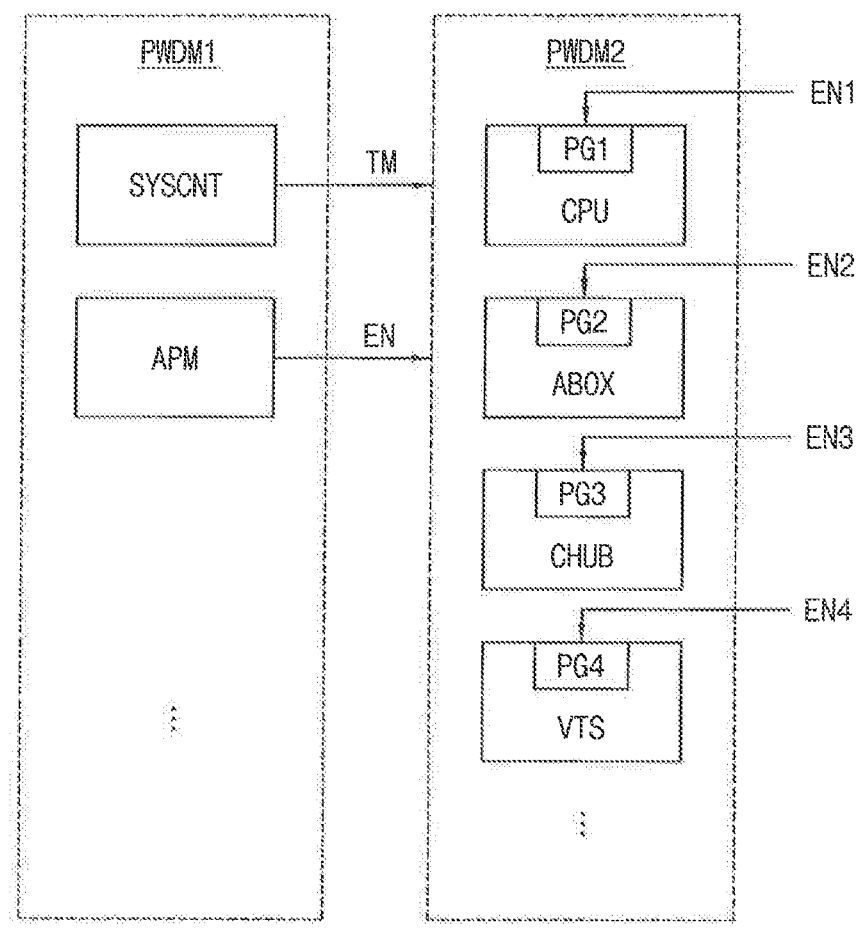

FIGS. 11A and 11B are diagrams for describing power domains of an application processor according to exemplary embodiments of the inventive concept.

An application processor may include a plurality of power domains that are independently powered. FIGS. 11A and 11B illustrate a first power domain PWDM1 and a second power domain PWDM2 as an example. The first power domain PWDM1 corresponds to an always-powered domain in which power is supplied in both of an active mode and a standby mode (or a sleep mode), and the second power domain PWDM2 corresponds to a power-save domain in which power is blocked in the standby mode.

Referring to FIG. 11A, in an exemplary embodiment, a system counter SYSCNT, an active power manager APM, and a voice trigger system VTS are disposed in the always-powered domain PWDM1. A plurality of hardware blocks such as, for example, a host processor CPU, an audio subsystem ABOX, a sensor hub CHUB, etc. may be disposed in the power-save domain PWDM2.

The system counter SYSCNT may generate time information TM and provide the time information TM to internal circuits of the system. The active power manager APM may generate a plurality of power enable signals EN that control power supply, power blocks, etc. of various elements in the system. The voice trigger system VTS may generate an interrupt signal ITRR representing the trigger event.

Herein, the active mode represents a mode in which at least the host processor CPU is enabled and an operating system (OS) is running. The sleep mode or the standby mode represents a power-down mode in which the host processor CPU is disabled.

In comparison with the disposition of FIG. 11A, the voice trigger system VTS in FIG. 11B is disposed in the power-save domain PWDM2.

As illustrated in FIGS. 11A and 11B, the host processor CPU, the voice trigger system VTS, the audio subsystem ABOX, and the sensor hub CHUB may include power gating circuits PG1, PG2, PG3 and PG4, respectively. The power gating circuits PG1~PG4 may supply power selectively in response to power enable signals EN1, EN2, EN3 and EN4. As a result, the voice trigger system VTS, the audio subsystem ABOX, and the sensor hub CHUB may be power-gated and enabled independently of the host processor CPU.

Exemplary embodiments of the present inventive concept may be applied to any electronic devices and systems supporting the voice trigger function. For example, exemplary embodiments of the present inventive concept may be applied to systems such as a desktop computer, a laptop computer, a cellular phone, a smartphone, an MP3 player, a personal digital assistant (PDA), a portable multimedia player (PMP), a digital television, a digital camera, a server computer, a workstation, a set-top box, a portable game console, a navigation system, a wearable device, an Internet of Things (IoT) device, an Internet of Everything (IoE) device, an e-book, a virtual reality (VR) device, an augmented reality (AR) device, etc.

As is traditional in the field of the inventive concept, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the exemplary embodiments may be physically separated into two or more interacting and discrete blocks, units and/or modules without departing from the scope of the inventive concept. Further, the blocks, units and/or modules of the exemplary embodiments may be physically combined into more complex blocks, units and/or modules without departing from the scope of the inventive concept.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. An application processor, comprising:
a system bus;
a host processor electrically connected to the system bus;
a voice trigger system electrically connected to the system bus, wherein the voice trigger system is configured to perform a voice trigger operation that monitors whether a trigger input signal includes a particular trigger sound and issue a trigger event based on the trigger input signal provided through a trigger interface; and
an audio subsystem electrically connected to the system bus, wherein the audio subsystem is configured to process audio streams that are replayed or recorded through an audio interface,
wherein the trigger interface is disabled, and an interrupt signal is received by the audio subsystem through the audio interface, while an audio replay operation is performed through an output pad of the audio interface,
wherein the audio subsystem receives the interrupt signal through the audio interface and the audio replay operation is performed through the output pad of the audio interface simultaneously, and
wherein the audio subsystem receives an audio input signal through an input pad of the audio interface and the voice trigger system performs the voice trigger operation based on the audio input signal while the audio replay operation is performed simultaneously through the output pad of the audio interface.

2. The application processor of claim 1, wherein the system bus, the host processor, the voice trigger system, and the audio subsystem are integrated in a single semiconductor chip.

3. The application processor of claim 1, wherein the audio subsystem comprises:
an echo canceller to perform an echo cancellation operation with respect to audio input data of the audio input signal to generate compensated sample data, and
wherein the audio subsystem transfers the compensated sample data to the voice trigger system and the voice trigger system performs the voice trigger system based on the compensated sample data.

4. The application processor of claim 1, wherein the audio subsystem transfers the audio input signal to the voice trigger system,
wherein the voice trigger system comprises:
an echo canceller to perform an echo cancellation operation with respect to audio input data of the audio input signal to generate compensated sample data, and
wherein the voice trigger system performs the voice trigger system based on the compensated sample data.

5. The application processor of claim 1, wherein the voice trigger system receives the trigger input signal through the trigger interface and performs the voice trigger operation based on the trigger input signal while the audio subsystem is disabled.

6. The application processor of claim 1, wherein the audio subsystem receives the interrupt signal through an interrupt pad of the audio interface.

7. The application processor of claim 6, wherein the audio subsystem receives the audio input signal for the voice trigger operation through the input pad of the audio interface and simultaneously receives the interrupt signal through the interrupt pad of the audio interface while the audio replay operation is performed through the output pad of the audio interface.

8. The application processor of claim 1, further comprising:
a mail box module configured to support synchronization of data communication between the voice trigger system and the audio subsystem.

9. The application processor of claim 1, further comprising:
a direct bus electrically connecting the voice trigger system and the audio subsystem.

10. The application processor of claim 9, wherein data communication between the voice trigger system and the audio subsystem is performed through the direct bus independently of the system bus.

11. The application processor of claim 9, wherein an echo canceller disposed in the audio subsystem generates compensated audio input data by performing an echo cancellation operation with respect to audio input data of an audio input signal based on audio output data of an audio output signal, and transfers the compensated audio input data to the voice trigger system through the direct bus independently of the system bus, and
wherein the voice trigger system performs the voice trigger operation based on the compensated audio input data.

12. The application processor of claim 1, wherein the audio interface comprises:
a BLUETOOTH input pad that receives the audio input signal from a BLUETOOTH module;
a BLUETOOTH output pad that transmits an audio output signal to the BLUETOOTH module; and
a BLUETOOTH interrupt pad that receives an interrupt signal from the BLUETOOTH module.

13. The application processor of claim 12, wherein the audio subsystem receives the audio input signal for the voice trigger operation through BLUETOOTH input pad and simultaneously receives the interrupt signal through the BLUETOOTH interrupt pad while the audio replay operation is performed through the BLUETOOTH output pad.

14. The application processor of claim 1, wherein the audio interface includes:
a USB input pad that receives the audio input signal from a USB module;
a USB output pad that transmits an audio output signal to the USB module; and
a USB interrupt pad that receives the interrupt signal from the USB module.

15. The application processor of claim 1, wherein each of the voice trigger system and the audio subsystem is power-gated and enabled independently of the host processor.

16. An electronic device, comprising:
an application processor; and
at least one audio input/output device, wherein the application processor comprises:
a system bus;
a host processor electrically connected to the system bus;
a voice trigger system electrically connected to the system bus, wherein the voice trigger system is configured to perform a voice trigger operation that monitors whether a trigger input signal includes a particular trigger sound and issue a trigger event based on the trigger input signal provided through a trigger interface; and an audio subsystem electrically connected to the system bus, wherein the audio subsystem is configured to process audio streams that are replayed or recorded through an audio interface, wherein the trigger interface is disabled, and an interrupt signal is received by the audio subsystem through the audio interface, while an audio replay operation is performed through an output pad of the audio interface, wherein the audio subsystem receives the interrupt signal through the audio interface and the audio replay operation is performed through the output pad of the audio interface simultaneously, and wherein the audio subsystem receives an audio input signal through an input pad of the audio interface and the voice trigger system performs the voice trigger operation based on the audio input signal while the audio replay operation is performed simultaneously through the output pad of the audio interface.

17. The electronic device of claim 16, wherein the audio interface comprises:
   a BLUETOOTH input pad that receives the audio input signal from a BLUETOOTH module;
   a BLUETOOTH output pad that transmits an audio output signal to the BLUETOOTH module; and
   a BLUETOOTH interrupt pad that receives the interrupt signal from the BLUETOOTH module.

18. A method of operating an application processor, comprising:
   receiving a trigger input signal provided through a trigger interface;
   issuing, by a voice trigger system, a trigger event based on the trigger input signal, wherein the voice trigger system, an audio subsystem, and a host processor are electrically connected to one another via a system bus in a single semiconductor chip that forms the application processor;
   processing, by the audio subsystem, audio streams that are replayed or recorded through an audio interface;
   disabling the trigger interface while an audio replay operation is performed through an output pad of the audio interface;
   receiving, by the audio sub system, an audio input signal through an input pad of the audio interface while the audio replay operation is performed simultaneously through the output pad of the audio interface; and
   performing, by the voice trigger system, a voice trigger operation based on the audio input signal while the audio replay operation is performed through the output pad of the audio interface.

19. The method of claim 18, further comprising:
   receiving, by the audio subsystem, an interrupt signal through the audio interface while the audio replay operation is performed simultaneously through the audio interface.

20. The method of claim 18, wherein performing the voice trigger operation based on the audio input signal comprises:
   performing, by the audio subsystem or the voice trigger system, an echo cancellation operation with respect to audio input data of the audio input signal to generate compensated sample data; and
   performing, by the voice trigger system, the voice trigger system based on the compensated sample data.

* * * * *